US011294639B2

(12) United States Patent
Cambou (10) Patent No.: US 11,294,639 B2
(45) Date of Patent: Apr. 5, 2022

(54) NATIVE TERNARY RANDOM NUMBERS GENERATION

(71) Applicant: Arizona Board of Regents on Behalf of Northern Arizona University, Flagstaff, AZ (US)

(72) Inventor: Bertrand Francis Cambou, Flagstaff, AZ (US)

(73) Assignee: Arizona Board of Regents on Behalf of Nothern Arizona University, Flagstaff, AZ (US)

( * ) Notice: Subject to any disclaimer, the term of this patent is extended or adjusted under 35 U.S.C. 154(b) by 44 days.

(21) Appl. No.: 16/492,581

(22) PCT Filed: Jul. 27, 2018

(86) PCT No.: PCT/US2018/044160
§ 371 (c)(1),
(2) Date: Sep. 9, 2019

(87) PCT Pub. No.: WO2019/027839
PCT Pub. Date: Feb. 7, 2019

(65) Prior Publication Data
US 2020/0150929 A1    May 14, 2020

Related U.S. Application Data

(60) Provisional application No. 62/541,030, filed on Aug. 3, 2017.

(51) Int. Cl.
*G06F 7/58*   (2006.01)
*G06F 7/49*   (2006.01)
*H04L 9/32*   (2006.01)

(52) U.S. Cl.
CPC .............. *G06F 7/588* (2013.01); *G06F 7/49* (2013.01); *H04L 9/3278* (2013.01)

(58) Field of Classification Search
CPC ... G06F 7/49; G06F 7/58; G06F 7/582; G06F 7/584; G06F 7/588; H04L 9/0816;
(Continued)

(56) References Cited

U.S. PATENT DOCUMENTS 10,404,478 B2 *  9/2019  Hung .................... H04L 9/3278
2005/0207207 A1  9/2005  Gammel et al.
(Continued)

OTHER PUBLICATIONS

B. Cambou et al., PUF designed with Resistive RAM and Ternary States, CISRC'16, ACM, Apr. 5-7, 2016 (Year: 2016).*
(Continued)

*Primary Examiner* — Emily E Larocque
(74) *Attorney, Agent, or Firm* — Quarles & Brady LLP (57) ABSTRACT

A system and method for random number generation are presented. A plurality of parameter values are generated by inspecting a plurality of cells in a memory array. Each parameter value in the plurality of parameter values is associated with a cell of the plurality of cells. A plurality of unstable cells in the plurality of cells are identified. Each unstable cell in the plurality of unstable cells is associated with a parameter value within a threshold value of an average of the plurality of parameter values. First, second and third groups of cells in the plurality of unstable cells identified and associated with values. The groups are determined based upon the parameter values associated with the cells in each group. A data stream is generated using the first group of cells, the second group of cells, and the third group of cells.

20 Claims, 11 Drawing Sheets

US 11,294,639 B2

Page 2

(58) Field of Classification Search
CPC ....... H04L 9/0861; H04L 9/0869; H04L 9/32; H04L 9/3278; H04L 63/0428; H04L 63/06–63/064; H04L 2209/08; H04L 2209/12; G11C 15/00–06
See application file for complete search history.

(56) References Cited

U.S. PATENT DOCUMENTS

| | | |
|---|---|---|
| 2012/0236618 A1* | 9/2012 | Lee ................. G11C 15/046 365/49.17 |
| 2015/0268934 A1 | 9/2015 | Anderson et al. |
| 2016/0148679 A1* | 5/2016 | Yoshimoto ......... G11C 13/0059 365/148 |
| 2017/0046129 A1 | 2/2017 | Cambou |
| 2017/0279606 A1* | 9/2017 | Kara-Ivanov ....... G06F 21/6209 |

OTHER PUBLICATIONS

S. Tao et al., TVL-TRNG: Sub-microwatt True Random Number Generator Exploiting Metastability in Ternary Valued Latches, 2017, IEEE 47th International Symposium on Muliple-Valued Logic, IEEE Computer Society, 2017 (Year: 2017).*
B.F. Cambou, Design of True Random Numbers Generators with Ternary Physical Unclonable Functions, Advances in Science, Technology and Engineering Systems Journal vol. 3, No. 3, 15-29, 2018 (Year: 2018).*
B. Cambou, A XOR Data Compiler Combined with Physical Unclonable Function for True Random Number Generation, Computing Conference 2017 (Year: 2017).*

* cited by examiner

| $P=1/9+\Delta\cdot\lambda$ | | Δ Per Type of Cell | | | Prob. to have -; 0; + |
|---|---|---|---|---|---|
| | | A(-) | B(0) | C(+) | |
| Prob. Δ When Tested | be:- | +1.8 | -0.45 | -1.35 | 1/3 |
| | be:0 | -0.45 | +0.9 | -0.45 | 1/3 |
| | be:+ | -1.35 | -0.45 | +1.8 | 1/3 |
| Prob. to have A, B, or C | | 1/3 | 1/3 | 1/3 | |

FIG. 6B

| $P=1/27+\Delta\cdot\lambda^2$ | | Δ Per Type of Pair to Form c = $a_1 + a_1$ mod 3 | | | | | | | | | Prob. to have -; 0; + |
|---|---|---|---|---|---|---|---|---|---|---|---|
| | | AA | AB | AC | BA | BB | BC | CA | CB | CC | |
| Prob. Δ When Tested | be:- | +0.20 | +2.43 | -2.63 | +2.43 | -0.61 | -1.82 | -2.63 | -1.82 | +4.46 | 1/3 |
| | be: 0 | -4.66 | -0.61 | +5.26 | -0.61 | +1.5 | -0.61 | +5.26 | -0.61 | -4.66 | 1/3 |
| | be: + | +4.46 | -1.82 | -2.63 | -1.82 | -0.61 | +3.43 | -2.63 | +2.43 | +0.20 | 1/3 |
| Prob. to have AA, AB, or CC | | 1/9 | 1/9 | 1/9 | 1/9 | 1/9 | 1/9 | 1/9 | 1/9 | 1/9 | |

Initial Deviation from Randomness:

$$\lambda i = (1/9) \Sigma |\Delta.\lambda| = \lambda$$

| P=1/9+Δ.λ | | Δ Per Type of Cell | | |
|---|---|---|---|---|
| | | A(-) | B(0) | C(+) |
| Probability After Testing | P- (to be -) | +1.8 | -0.45 | -1.35 |
| | P0 (to be 0) | -0.45 | +.9 | -0.45 |
| | P+ (to be +) | -1.35 | -0.45 | +1.8 |

FIG. 7A

Resulting Deviation from Randomness:

$$\lambda'f = (1/27) \Sigma |\Delta.\lambda^2| \approx 2.27\lambda^2$$

| P=1/9+Δ.λ² | | Δ Per Type of Cell | | |
|---|---|---|---|---|
| | | A'(-) CC AB BA | B'(0) BB AC CA | C'(+) AA BC CB |
| Probability After Testing | P- (to be -) | +3.10 | -1.95 | -1.15 |
| | P0 (to be 0) | -1.95 | +3.9 | -1.95 |
| | P+ (to be +) | -1.15 | -1.95 | +3.10 |

| Case | % of X-Cells | $\lambda i = \lambda$ | $\lambda' f \approx 2.27\, \lambda^2$ <br> 2 Cells | $\lambda''' f \approx 11.3\, \lambda^4$ <br> 4 Cells | $\lambda'''' f \approx 290\, \lambda^8$ <br> 8 Cells |
|---|---|---|---|---|---|
| 1 | 2%  | $2\,10^{-2}$ | $8.7\,10^{-4}$ | $1.81\,10^{-6}$ | $7.4\,10^{-12}$ |
| 2 | 4%  | $4\,10^{-2}$ | $3.6\,10^{-3}$ | $2.9\,10^{-5}$  | $1.9\,10^{-9}$  |
| 3 | 7%  | $6\,10^{-2}$ | $8\,10^{-3}$   | $1.46\,10^{-4}$ | $4.87\,10^{-8}$ |
| 4 | 11% | $1\,10^{-1}$ | $2.3\,10^{-2}$ | $1.1\,10^{-3}$  | $2.9\,10^{-6}$  |

NATIVE TERNARY RANDOM NUMBERS GENERATION

CROSS REFERENCE TO RELATED APPLICATIONS

This application is a U.S. National Stage of PCT Application No. PCT/US2018/044160 filed on Jul. 27, 2018 which claims priority to U.S. Provisional Patent Application No. 62/541,030 entitled "NATIVE TERNARY RANDOM NUMBERS GENERATION" and filed on Aug. 3, 2017. This application is related to US patent application publication 2017/0046129.

TECHNICAL FIELD

The present disclosure relates to implementations of computing systems. Specifically, the disclosure describes implementations of physically unclonable functions (PUFs) and true random number generators.

BACKGROUND

Ternary computing uses trits or a base three numeral system. For example, (0, 1, 2) or balanced (−, 0, +) instead of the bits (0, 1) used in typical binary computing. Random numbers are needed for multiple security protocols, such as cryptography, computer security, or other applications where unpredictable results are important. One way to create ternary random numbers is to convert binary random numbers into decimal numbers, then to convert the decimal data stream back into ternary random numbers. Such a method adds complexity to the process and can potentially create vulnerabilities that expose the random numbers to hackers. A direct generation of native ternary random numbers is therefore desirable as a more secure, simple solution.

DETAILED DESCRIPTION

This disclosure, its aspects and implementations, are not limited to the specific components, assembly procedures or method elements disclosed herein. Many additional components, assembly procedures and/or method elements known in the art consistent with the intended physically unclonable function (PUF) systems and related methods for random number generation will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such physically unclonable function generating systems and method implementations, and implementing components and methods, consistent with the intended operation and methods.

PUFs form a set of cryptographic primitives used in authentication/cryptographic methods. The underlying authentication mechanism in which PUFs are used is in generating challenge-response pairs/patterns (CRPs). PUFs that are unique to each device allow an authentication system to challenge a device seeking authentication, receive half of a CRP pair from the device, and then compare the received half with a stored CRP pair to verify whether the values match. Where the PUFs take advantage of the natural manufacturing variations unique to the device seeking authentication, a large number of challenge (i.e., input) response (i.e., output) pairs can be generated.

In various authentication systems, the challenges of a CRP are stored in a secure server coupled to the device being prepared or tested for authentication. The device is attempting to access resources to which access is controlled by the secure server, and so the secure server must approve authentication of the device in order for the device to access the resources. Once generated during the initial portions of the authentication cycle, the PUFs are then used in challenge queries. Authentication is granted by the system when the rate of matching responses between the PUF generated CRPs is above a threshold value. Weak PUFs generally only produce a satisfactory rate of responses far from 100% matching, while with strong PUFs the rate approaches 100%. Other criteria used to assess the quality of a PUF are, by non-limiting example, the size (in bits) of the CRPs and the robustness of the responses with respect to temperature and voltage variations, electromagnetic interferences, and device aging. When PUFs are used, their nature creates a cryptographic expectation of randomness and uniqueness that should make good PUFs hard to extract and identify for unwelcome users and easy to implement and use for secure authentication.

Various system implementations may be utilized in conjunction with PUFs to perform authentication. With RAM-based architectures, PUF keys are extracted from a PUF RAM memory generator and provided to the secure processor of the device seeking to be authenticated by the secure server. The secure processor then performs a comparison of the PUF key extracted from the memory with a stored PUF key provided for the authentication from the secure server. Alternatively, Content Addressable Memory (CAM) implementations can directly perform PUF key matching "in situ," which may further enhance the level of security over RAM-based authentication systems. For example, when attacking a RAM-based system, hackers will attempt to use bad keys to extract the PUF secret key transferred from the PUF memory to the secure element. However, since the PUF key matching is done directly between the CAM memory and the secure processor, this key extraction method will not work in a CAM-based architecture.

The uniqueness of each PUF device and the difficulty of copying or recreating a PUF device derives from the variability in the PUF devices created by intrinsic manufacturing variations of semiconductor devices that are created during the fabrication of the devices. Non-limiting examples of such variations that alter device characteristics include variations in critical dimensions, doping level(s) of semiconducting materials, threshold voltages, variations in lot-to-lot processing and variations in wafer-to-wafer processing. These variations make each device unique and distinguishable, and therefore identifiable from every other PUF device. Accordingly, each PUF device manufactured has its own device fingerprint.

Methods to create binary random number generators (RNGs) from PUFs may utilize static random access memory (SRAM), dynamic random access memory (DRAM), Flash RAMs, Resistive RAM (ReRAM), or spin transfer torque magnetic random access memory (STT MRAM). Intrinsic variations due to manufacturing variations in the memory arrays are exploited for binary random number generators.

A method to generate random numbers with such PUF device-based systems involves characterizing a particular parameter $\mathcal{P}$ of the cells of the memory array in the PUF device with a "built-in self-test" (BIST) module. Each cell being different, the value of parameter $\mathcal{P}$ varies (in some cases, only by small amounts) cell to cell and follows a distribution with a median value T. In typical applications, the parameter $\mathcal{P}$ may be, for example, the set voltage $V_{set}$ for a particular memory cell (i.e., the required voltage that must be applied to the memory cell to change its value). Due to manufacturing variance, each cell in a particular memory array may have different $V_{set}$ values. In some cases, determining the parameter $\mathcal{P}$ value for a particular cell may involve sampling the parameter $\mathcal{P}$ values multiple times (the samples may vary by small amounts from one sample to the next) and then determining an average value of the various samples parameter $\mathcal{P}$ values.

For challenge and response generation, all cells with $\mathcal{P}$ below T can be associated with a first value "0" and cells with $\mathcal{P}$ above T can be associated with a second value "1". The cells of memory arrays are segmented between the predictable cells, which reliably produce a "1" or "0", and other cells that are associated with a value of "X". Such cells are unstable and produce a value close to the threshold T. Upon taking multiple samples of the parameter $\mathcal{P}$ value for such an unstable or "X" cell, the parameter $\mathcal{P}$ values will sometimes be below the threshold T and sometimes above the threshold T. For example, unstable cells may be those cells (e.g., within a memory array) having a parameter $\mathcal{P}$ value that is very close to the median value T. These characteristics enable the design of both solid PUFs and ternary random number generators (TRNGs), as described herein.

Each bit of a binary data stream of N bits of a perfect (i.e., perfectly random) RNG should have precisely the same probability to be either a "1" or a "0", $P_{(X=1)}=P_{(X=0)}=0.5$. For a particular binary data stream, the average deviation from perfect randomness in the data stream, denoted by $\lambda$, is given by: $\lambda = \frac{1}{2}(|P_{(X=1)} - 0.5| + |p_{(X=0)} - 0.5|)$.

Ternary data streams have three potential values (e.g., "−", "0", and "+"). In the case of such a ternary data stream with three possible data states consisting of "−", "0", or "+", $\lambda$ is given by:

$$\lambda = \frac{1}{3}(|P_{X=-} - \frac{1}{3}| + |P_{X=0} - \frac{1}{3}| + |P_{X=+} - \frac{1}{3}|).$$

In one case, the length of a RNG data stream may be N=128 (i.e., the data stream includes 128 bits or trits of data), making the number of possible combinations $2^{128} = 3.4 \times 10^{38}$ for binary streams, and $3^{128} = 1.2 \times 10^{61}$ for ternary streams, which is considerably larger. For a typical random data stream for binary data, a target value for $\lambda$ may be less than $<10^{-5}$.

In some cases, multiple data streams may be combined together to form a single resulting data stream having a $\lambda$ value that is less than the $\lambda$ values of the individual input data streams. For example, two data streams may be combined together using a modulo function to generate a new data stream having a reduced $\lambda$ value. In such an application, a first bit of the first data stream and a first bit of the second data stream are combined using the modulo function to generate an output bit that becomes the first bit in the output data stream. In a similar manner, a second bit of the first data stream and a second bit of the second data stream are combined using the modulo function to generate an output bit that becomes the second bit in the output data stream.

This process continues until all bits of the two input data streams have been processed to generate an output data stream having the same length as each of the input data streams. Because the output data stream includes the modulo combination of the bits of the input data stream, the $\lambda$ value associated with the output data stream is lower than the $\lambda$ values of each of the input data streams, indicating that the output data stream is closer to being perfectly random than the individual input data streams.

For example, some embodiments of the present system may utilize ⊕ modulo 3 sum adders to combine multiple data streams for additional randomization. With modulo 3 sum adders, two input trits X, and Y are transformed into the output trit Z via the following equation Z=X⊕Y, with the following truth table: (Z=−) if (X=0) and (Y=−), or (X=−) and (Y=0), or (X=Y=+); (Z=0) if (X=+) and (Y=−), or (X=−) and (Y=+), or (X=Y=0); (Z=+) if (X=0) and (Y=+), or (X=+) and (Y=0), or (X=Y=−).

A reason modulo 3 sum adders used in this manner can increase randomness is that the knowledge of the value of the output trit Z does not disclose the value of the two input trits X and Y. For example, Z=−, Z=0, or Z=+ can all be the result of three different XY pairs with equal probability. If two trits X and Y are at least somewhat random, the third trit Z is even more random than either of the individual trits X or Y. A quantification of the effect of modulo 3 sum adders in enhancing the randomization of native ternary RNG is presented below in combination with a method for producing a ternary true random number generator.

In the present system, PUF devices are utilized to generate random number sequences. Specifically, PUF devices are analyzed (e.g., via an initial self-test procedure) to identify unstable cells (e.g., those cells associated with the value "X", as described above) within the PUF device. Because the output of those cells given a particular input value at or close to the threshold value T is difficult to predict, such cells may be utilized to generate random (or pseudo-random) output values that can be combined into output data streams. Multiple data streams can then be combined using, for example, a modulo summing or adding operation, to generate a random output data stream.

Figure 1:
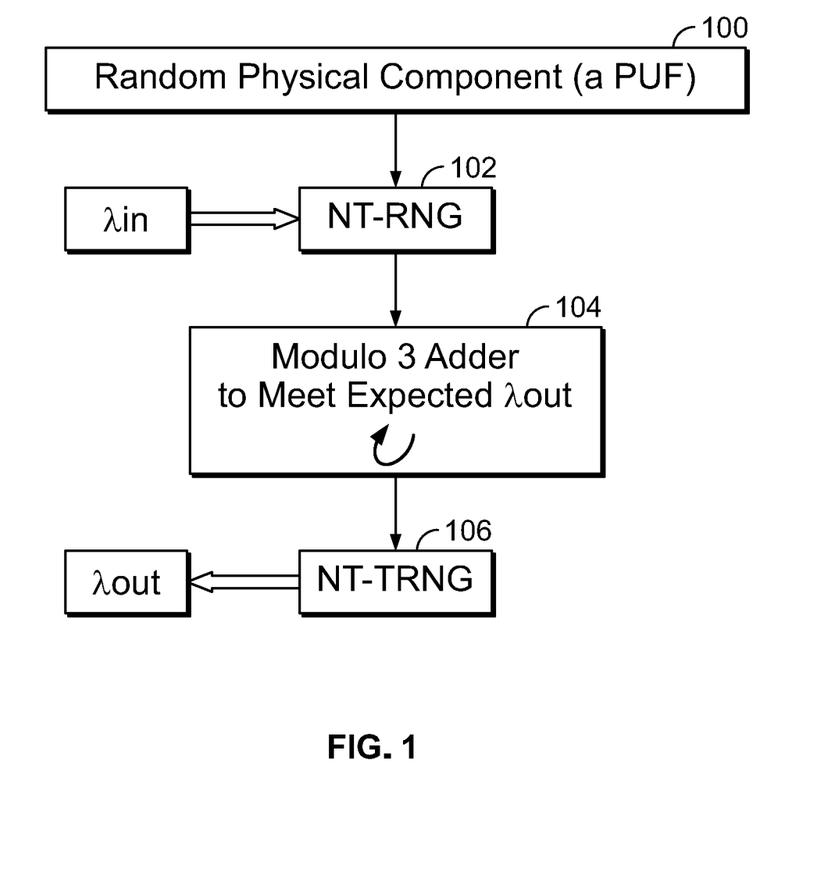
FIG. 1 is a block diagram depicting a native ternary true random number generator.

FIG. 1 is a block diagram depicting functional components of the present system. As illustrated, a PUF device 100 operates as a native ternary random number generator 102 to output an initial ternary output data stream. That data stream is associated with a λ value of $\lambda_{in}$. The output data stream generated by random number generator 102 is combined via modulo operator 104 (e.g., a module 3 adder) with other ternary random number data streams (e.g., potentially generated by PUF device 100 or other PUF devices) to implement native ternary true random number generator (NT-TRNG) 106. Because NT-TRNG 106 combines multiple input data streams, each having a λ value or $\lambda_{in}$, the output of NT-TRNG 106 is a ternary data stream having a λ value of $\lambda_{out}$, where $\lambda_{out}$ is less than $\lambda \backslash_{in}$.

When utilizing a PUF device to implement an NT-TRNG, the ternary X-cells of the PUF device are first sorted. Within the individual cells of a PUF memory array, it can be assumed that the distribution of a physical parameter $\mathcal{P}$ (e.g., the cell's set voltage $V_{set}$) used to determine if a cell is a "−" or "+" follows a normal distribution, with a standard variation σ due to inherent cell-to-cell variations created during manufacturing or by other instabilities. The median of the distribution represents a threshold $T_1$ that creates a binary system: if $\mathcal{P}$ for a particular cell falls below the threshold of the distribution that cell will be assigned a first value "−", while if the value of $\mathcal{P}$ for a particular cell is above the threshold, that cell will be assigned a second value "+".

It can also be assumed that every time a new measurement of $\mathcal{P}$ is taken on a cell, this measurement will also follow a normal distribution with a standard variation $\sigma_{intr}$ responding to various measurement instabilities, noise, and environmental variations. The standard deviation of the measurement $\sigma_{intr}$ can be much lower than the standard deviation a of the population for high-quality memory arrays, such that "−", and "+" are clearly and consistently defined by some memory cells. However, the cells of the memory array having $\mathcal{P}$ values that are close to the threshold, X-cells, are not stable. That is, sometimes, when the parameter $\mathcal{P}$ for the cell is measured, the parameter $\mathcal{P}$ may have a value greater than the threshold, but at other times, due to variabilities in the cell, the parameter $\mathcal{P}$ may have a value less than the threshold. Therefore, these cells cannot be reliably designated to either the first category (assigned the first value "−") or the second category (assigned the second value "+") and are instead designated as X-cells that having unstable or difficult to predict $\mathcal{P}$ values.

The process of identifying unstable X-cells versus the stable cells of a PUF device may include self-test operation that calls for measuring the $\mathcal{P}$ value of each cells in the PUF device multiple times. If a particular cell consistently and without variation has a $\mathcal{P}$ value that falls either below or above the threshold, that cell may be considered stable and may confidently be assigned a value of "−" or "+". But if, for the multiple $\mathcal{P}$ value samples, the $\mathcal{P}$ value for a particular cell changes between being below the threshold and above the threshold, that cell may be considered unstable and designated an X-cell in accordance with the present disclosure.

Figure 2:
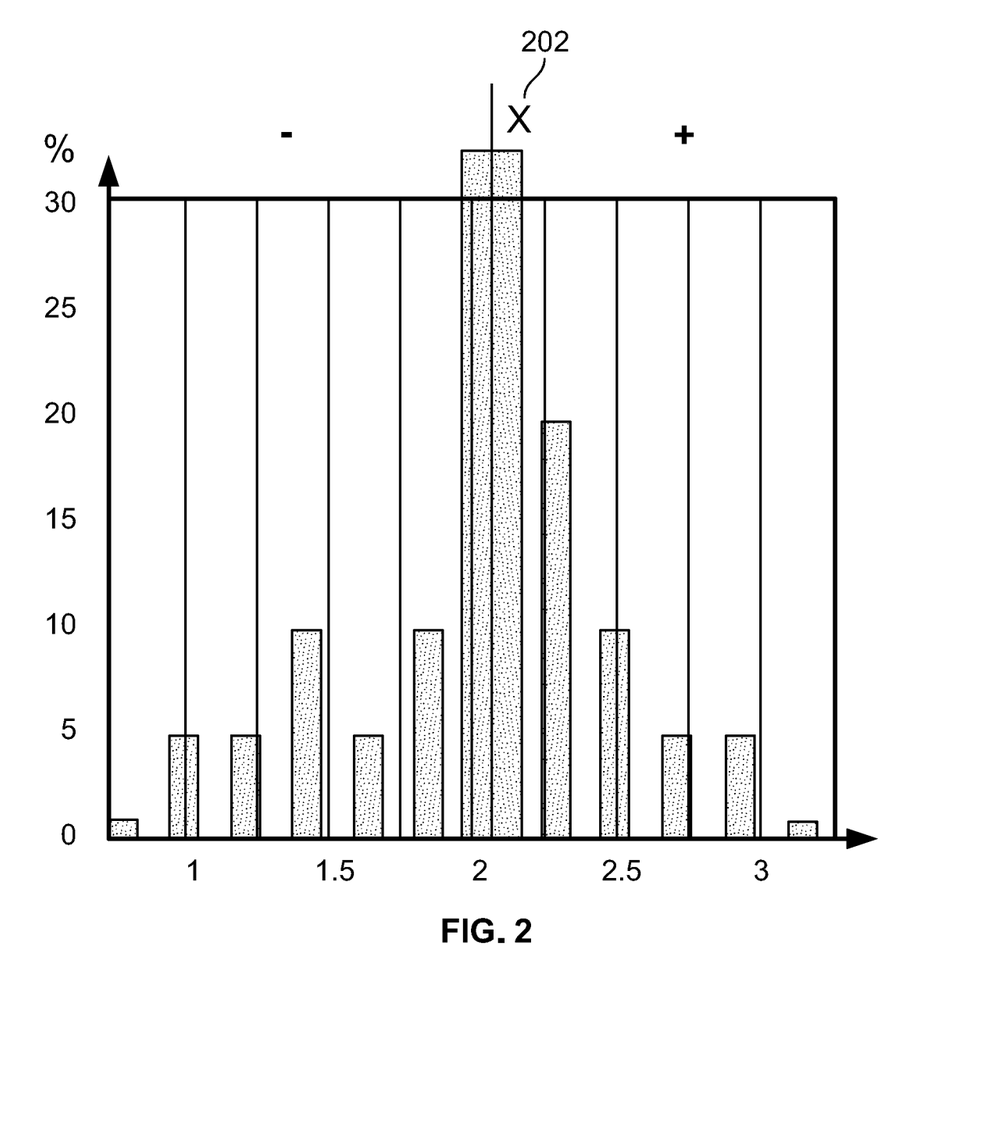
FIG. 2 is a graph illustrating parameter value distribution of cells in a PUF.

To illustrate, FIG. 2 is a histogram depicting the distribution of $\mathcal{P}$ values (specifically, the distribution of average $\mathcal{P}$ values) for a number of cells in a particular PUF device having a number of memory cells. As illustrated, the $\mathcal{P}$ values vary from a minimum value close to 0 up to a maximum of above a value of 3. Across all cells, the parameter $\mathcal{P}$ has an average or median value designated by threshold 202 in the center of the histogram. For cells having $\mathcal{P}$ values significantly (e.g., as determined by a pre-determined threshold) and consistently less than threshold 202 (e.g., less than a number of standard deviations below threshold 202) can be confidently associated with the first value '−', while cells having $\mathcal{P}$ values significantly (e.g., as determined by a pre-determined threshold) greater than threshold 202 (e.g., greater than a number of standard deviations above threshold 202) can be confidently associated with the second value '+'. But, cells having $\mathcal{P}$ values within a threshold value (e.g., within one or more standard deviations) of threshold 202 cannot confidently be associated with a particular value (i.e., due to environment factors the cells may switch between having $\mathcal{P}$ values less than threshold 202 and having $\mathcal{P}$ values greater than threshold 202). Those cells are designated as X-cells.

To maximize the randomness of an X-cell, the difference between the measurement of parameter $\mathcal{P}$ for the X-cell, and the median (e.g., threshold 202) is less than a threshold difference $\sigma_{intr}$, indicating the variations in $\mathcal{P}$ are due to measurement instabilities, maximizing the chance of a random flip between the cell being associated with a value "−" or "+" for that cell. Unstable X-cells, for which the parameter $\mathcal{P}$ does not consistently classify them as "−" or "+" cells, may then be one of three values, "−", "+", or "0." In such a case the level of randomness can be high; however, only a small percentage of the cells with a particular memory array may be categorized as X-cells. In an example embodiment for a 256 trit RNG, as many as 10,000 cells of the array may be required for high randomness.

Figure 3:
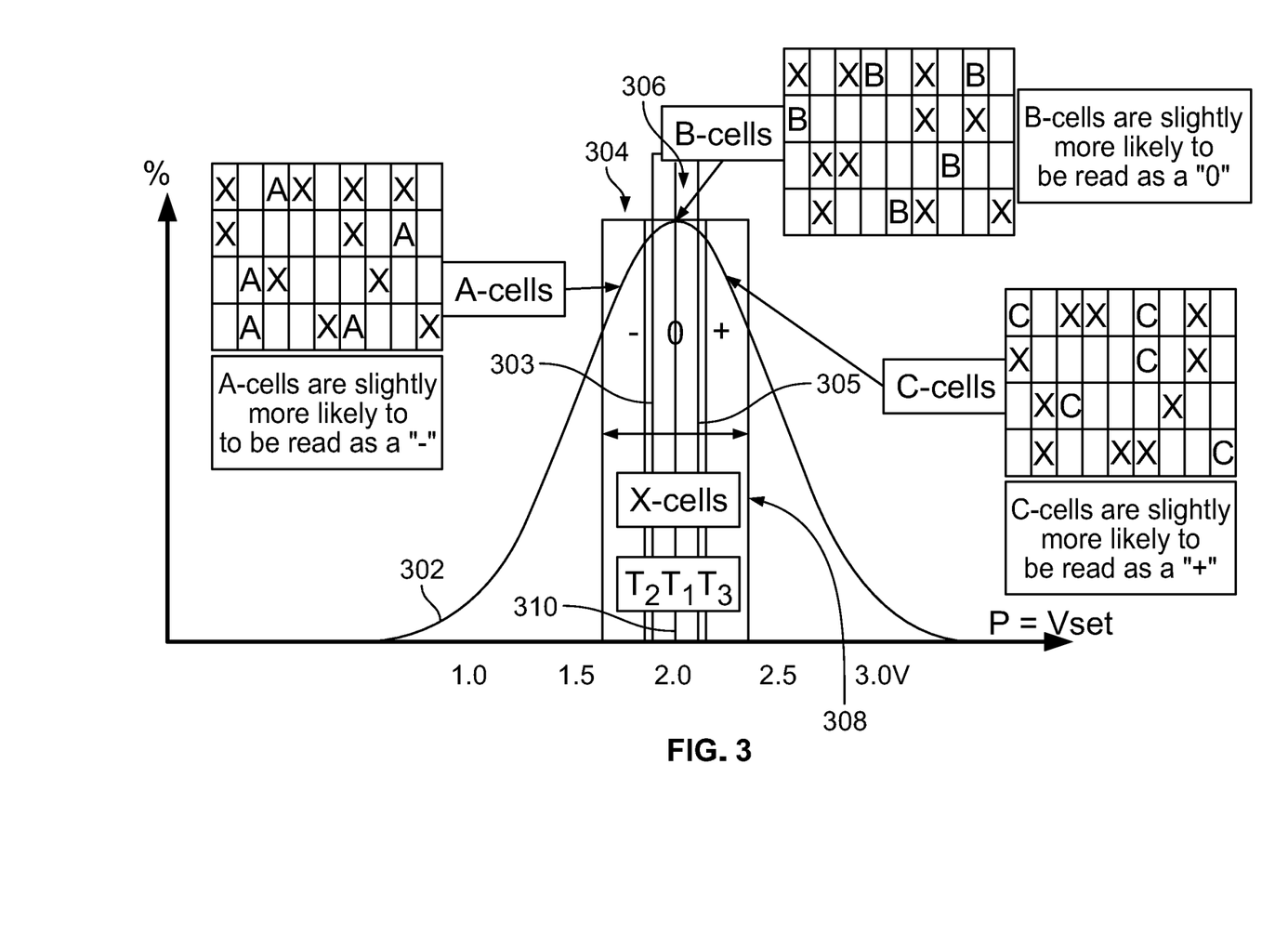
FIG. 3 depicts the probability distribution of a marginal cell in a PUF.

FIG. 3 is a graph including line 302 that illustrates a normal distribution of the measurement parameter $\mathcal{P}$ for an example cell within the memory array of a PUF device. As illustrated, for an X-cells whose average $\mathcal{P}$ value is measured as a value close to threshold 310, but slightly less than threshold 310 (these are cells that would be associated with the value "−" if their $\mathcal{P}$ values were not so close to threshold 310) fall under the distribution curve in area 304. Conversely, for X-cells whose average $\mathcal{P}$ values are close to threshold 310, but slightly greater than threshold 310 (these are cells that would be associated with the value "+" if their $\mathcal{P}$ values were not so close to threshold 310) fall under the distribution curve in area 308. Finally, X-cells, with an average parameter $\mathcal{P}$ value equal to or within a threshold value of threshold 310 fall within the shaded region 306.

These various cells can be further segmented into three subgroups based on their values of their parameter $\mathcal{P}$ value and, specifically, their average parameter $\mathcal{P}$ value. A-cells have an average parameter $\mathcal{P}$ value that falls within region 304, B-cells have an average parameter $\mathcal{P}$ value that falls within region 306, and C-cells have an average parameter $\mathcal{P}$ value that falls within region 308. The X-cells that have a higher probability to be tested as "−" are called A-cells. They have an average probability $P_{A=-}$ to be tested as "−", $P_{A=0}$ to be tested as "0", and $P_{A=+}$ to be tested as "+". The X-cells that have a higher probability to be tested as "0" are called B-cells. They have an average probability $P_{B=-}$ to be tested as "−", $P_{B=0}$ to be tested as "0", and $P_{B=+}$ to be tested as "+". The X-cells that have a higher probability to be tested as "+" are called C-cells. They have an average probability $P_{C=-}$ to be tested as "−", $P_{C=0}$ to be tested as "0", and $P_{C=+}$ to be tested as "+".

Two additional transition points or thresholds, $T_2$ 303 and $T_3$ 305 can be established in addition to the threshold 310. The selection of the transition point 303 between A-cells and B-cells, $T_2$, and the transition 305 of parameter $\mathcal{P}$ between B-cells and C-cells, $T_3$, can be such that each group can have an equivalent number of cells. In this method, the initial level of randomness $\lambda_i$ of the native ternary random number is given by:

$$\lambda_i = \frac{|1/9 - P_{A=-}|+|1/9 - P_{A=0}|+|1/9 - P_{A=+}|}{9} +$$
$$\frac{|1/9 - P_{B=-}|+|1/9 - P_{B=0}|+|1/9 - P_{B=+}|}{9} +$$
$$\frac{|1/9 - P_{C=-}|+|1/9 - P_{C=0}|+|1/9 - P_{C=+}|}{9}$$

With the X-cells of a PUF device characterized, the $\mathcal{P}$ values for the X-cells can be sampled at a particular time to generate a random data stream of trit values. Due to their inherent instability combined with environmental influence over the cells' $\mathcal{P}$ values, the $\mathcal{P}$ values sampled from the various X-cells will generate a somewhat random output of trits having values of either "−", "0", or "+". As described below, these values can be further modified via a modulo operation to generate an output that is a ternary random number enabling operation of the PUF device as a native ternary true random number generator.

Specifically, although the unstable X-cells have been characterized as either A, B, or C cells based upon their respective average parameter $\mathcal{P}$ values, because there is variability every time the parameter $\mathcal{P}$ value is sampled for a particular cell there is a chance that the parameter $\mathcal{P}$ value for any given unstable cell could fall within any of regions 304, 306, and 308 at any particular time the parameter $\mathcal{P}$ value is sampled. This variability leads to the value associated with a particular cell's parameter $\mathcal{P}$ value being at least somewhat random each time the parameter $\mathcal{P}$ value is sampled. This randomness may be exploited to generate a sequence of random trits, either by repeatedly sampling the parameter $\mathcal{P}$ value for a particular unstable cell or sampling the parameter $\mathcal{P}$ values for a number of different unstable cells within a memory array of a PUF device.

Although this approach of sampling parameter $\mathcal{P}$ values for a number of cells can generate a data stream of random trit values, some embodiments of the present system may use Modulo 3 sum adders to create a truly random number generator (TRNG) capable of generating a random data stream of trit values.

Figure 4:
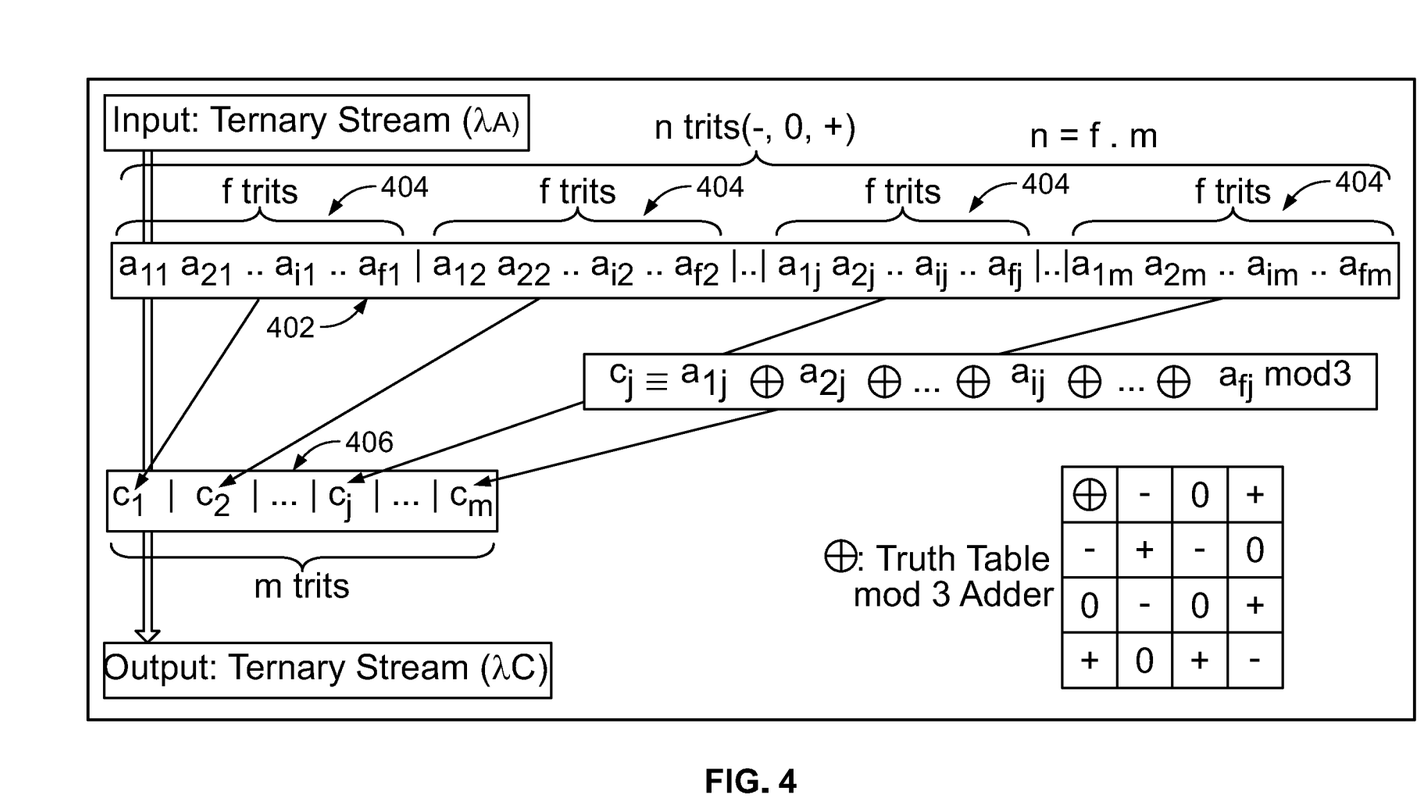
FIG. 4 depicts a sequence of steps in which a random number is generated using a modulo 3 adder.

FIG. 4 depicts the use of a modulo function to modify an initial trit data stream into a modified output stream having greater randomness. In one embodiment, the stream of random trits generated by the sampling of $\mathcal{P}$ values of the X-cells of a memory PUF array is $\{a_1, a_2, \ldots, a_i, \ldots a_n\}$ 402.

This stream 402 is grouped in chunks of f trits $\{a_{1j}, a_{2j}, \ldots, a_{ij}, \ldots, a_{if}\}$ 404 with f<n. For example, a data stream 402 of 1,280 random trits may be grouped in 128 chunks or groups 404 of 10 trits. The resulting stream of random trits obtained with Modulo 3 sum adders data $\{c_1, c_2, \ldots, c_j, \ldots, c_m\}$ 406 may be defined as follows: $c_j = a_{1j} \oplus a_{2j} \oplus \ldots \oplus a_{ij} \oplus \ldots \oplus a_{if}$ mod 3. The truth table of the modulo operation $\oplus$ is shown in FIG. 4.

As shown below, the randomization provided by an implementation of such a modulo function, when applied to groups of trits in a stream of random trits generated by the X-cells of a PUF memory array can be effective to generate truly random trits, enabling operation of the PUF memory array as a TRNG. In various embodiments, modulo 3 sum adders can be implemented at the software level, or in hardware of a PUF device with only a few logic gates. These gates can be inserted in the state machine of the PUF memory to directly feed secure processors, and cryptoprocessors with quality streams of random trits.

Figure 5:
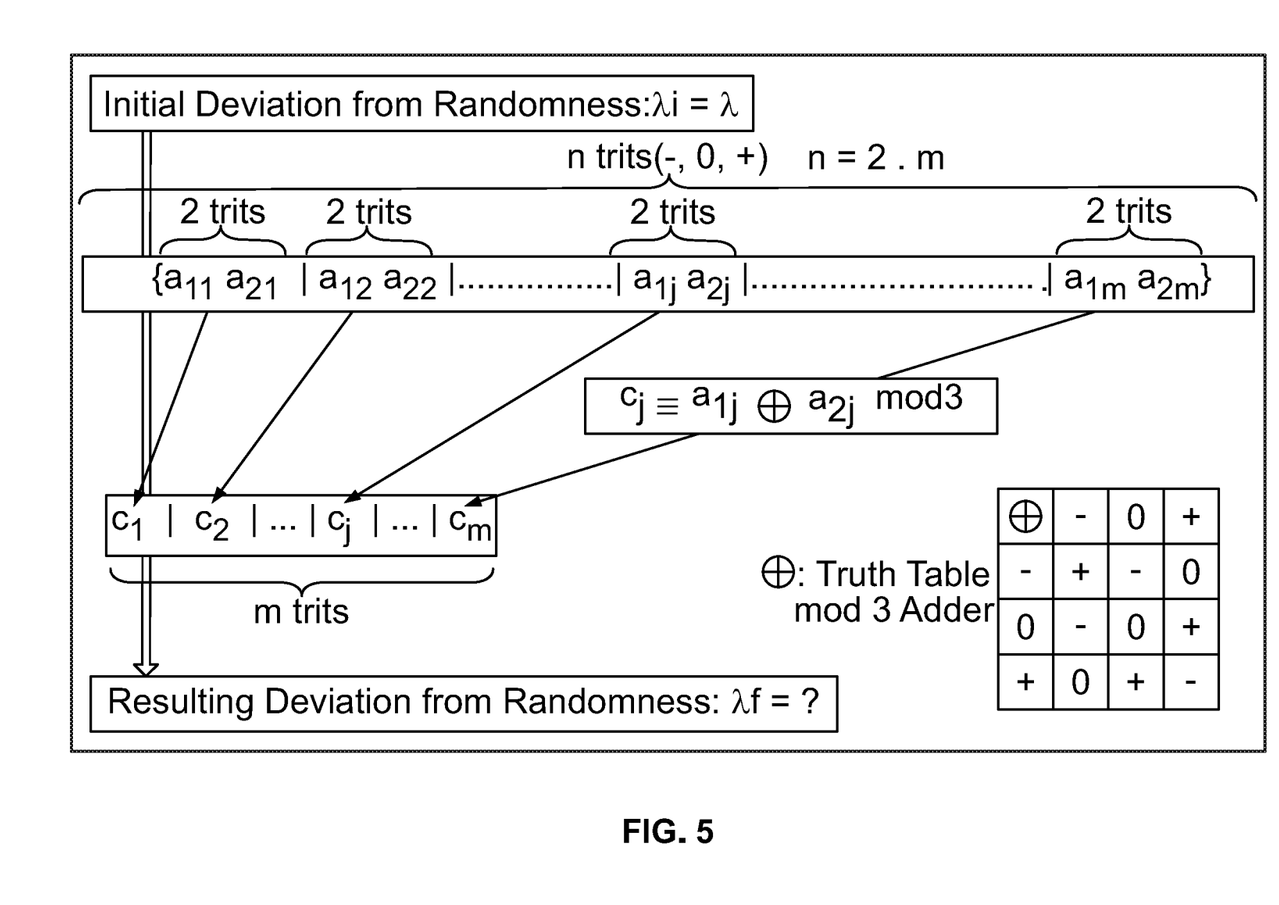
FIG. 5 is a simplified model of the modulo 3 adder with two cells.

An implementation of the present system utilizing modulo 3 sum adders with 2-cells may be implemented to quantify the level of randomness of the present random number generation approach. In a two cell implementation, two adjacent trits from different cells are added modulo 3. FIG. 5 shows an illustrated depiction of such an approach.

Figure 6A:
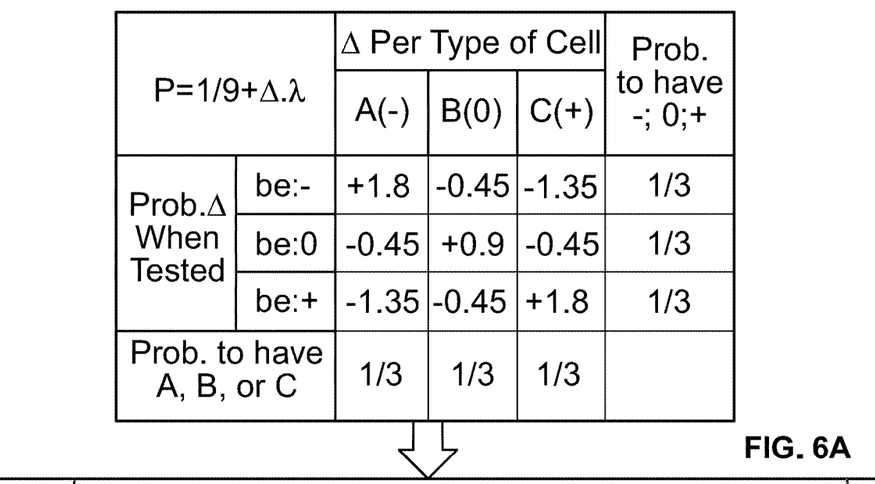
FIGS. 6A and 6B depict attributes of a random number generator utilizing output from two cells of a PUF to generate a random number.

As described above, in a two-cell approach, the X-cells of one or more PUF devices are equally distributed into three type of cells (A, B, & C), each of them with a probability of occurrence of ⅓. Statistically the stream of trits $\{a_1, a_2, \ldots, a_i, \ldots a_n\}$ contain trits with equal probability to be of type A (associated with a first value "−"), type B (associated with a second value "0"), or type C (associated with a third value "+"), each with a probability of ⅓. FIG. 6A is a table showing an example of distribution of probability verifying such a distribution. For example, $P_{A=-}=\frac{1}{9}+\Delta\cdot\lambda$ with $\Delta=1.8$; $P_{B=0}=\frac{1}{9}+\Delta\cdot\lambda$ with $\Delta=+0.9$; $P_{C=+}=\frac{1}{9}+\Delta\cdot\lambda$ with $\Delta=1.8$. The initial randomness is $\lambda_i=(\frac{1}{9}) \Sigma|\Delta\cdot\lambda|=\lambda$.

In some embodiments, the individual cells of a memory array may be combined by pairs to be added mod 3, creating nine possible combinations with an equal probability of ⅑. These pair combinations of A-cells, B-cells, and C-cells includes AA, AB, AC, BA, BB, BC, CA, CB, CD potential pair combinations. The overall probability to have trits with "−", "0", and "+" remain stable at ⅓ but increased number of possible combinations creates more randomness in the system. The value of a trit pair is determined by a truth table, such as the truth table depicted in FIGS. 4 and 5.

For example, one pair of cells may comprise two A-cells. The resulting trit may be determined to have a value of "−" when both A-cells are "+" (the probability is: $P_{A=+}P_{A=+}$), or the first A is "0" with the second A is "−" (the probability is: $P_{A=0}P_{A=-}$), or the first A is "−" with the second A is "0" (the probability is: $P_{A=-}P_{A=0}$). All together the probability $P_{AA=-}$ that two cells AA can result in a trit at "−" is given by:

$$P_{AA=-}=(P_{A=+}P_{A=+})+(P_{A=0}P_{A=-})+(P_{A=-}P_{A=0})=(\frac{1}{9}-1.35x\lambda)^2+2(\frac{1}{9}+1.8x\lambda)(\frac{1}{9}-0.45x\lambda)=\frac{1}{27}+0.2x\lambda^2$$

Figure 6B:
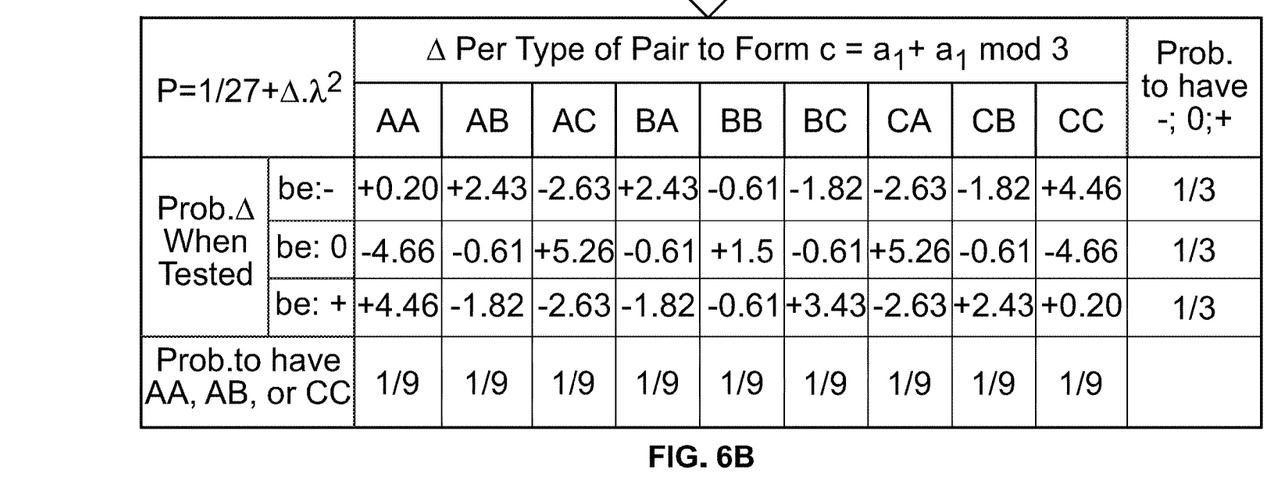

The table of FIG. 6B shows the probability to associate a cell with the value "−", "0", or "1" after addition mod 3 for each pair ($P_{AA=-}$, $P_{AA=0}$, $P_{AA=+}$, $P_{AB=-}$, $P_{AB=0}$, . . . ). The resulting deviation from randomness after addition is: $\lambda'f = (\frac{1}{27}) \Sigma|\Delta\cdot\lambda^2|\approx 2.27\lambda^2$.

For example, if the initial deviation from randomness is $\lambda=2\cdot 10^{-2}$; the resulting deviation is: $\lambda'f=2.27\times 2^2\times 10^{-4}=8.7\cdot 10^{-4}$.

Figure 7A:
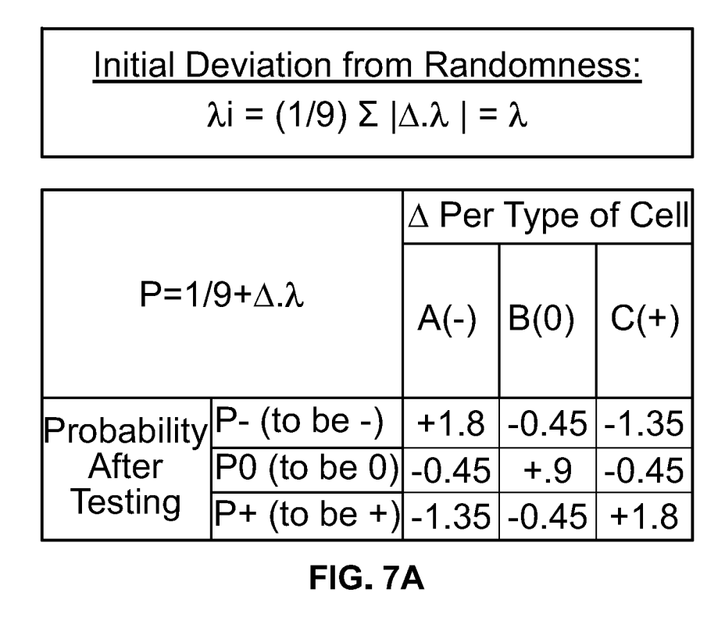
FIGS. 7A and 7B depict attributes of a random number generator using three groupings in combination with a modulo 3 adder with 2 cells.
Figure 7B:
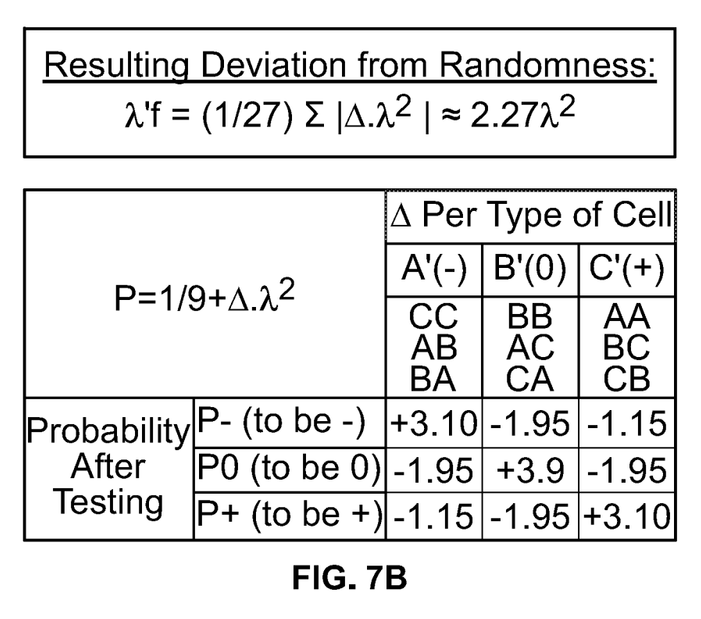

After addition, the nine possible configurations can be again combined into 3 type of cells A', B', and C'. FIG. 7A is a table showing the initial deviation from randomness, while FIG. 7B shows the deviation from randomness resulting from combining pairs of trinary values via a modulo function as described above. For example, the one that are mainly "−", the A'-cells consist of CC, AB, and BA pairs. The probability that A'-cell is "−" is $P_{A'=-}=P_{CC=+}+P_{AB=-}+P_{AB=0}=\frac{1}{9}+3.1\lambda^2$.

Figure 8:
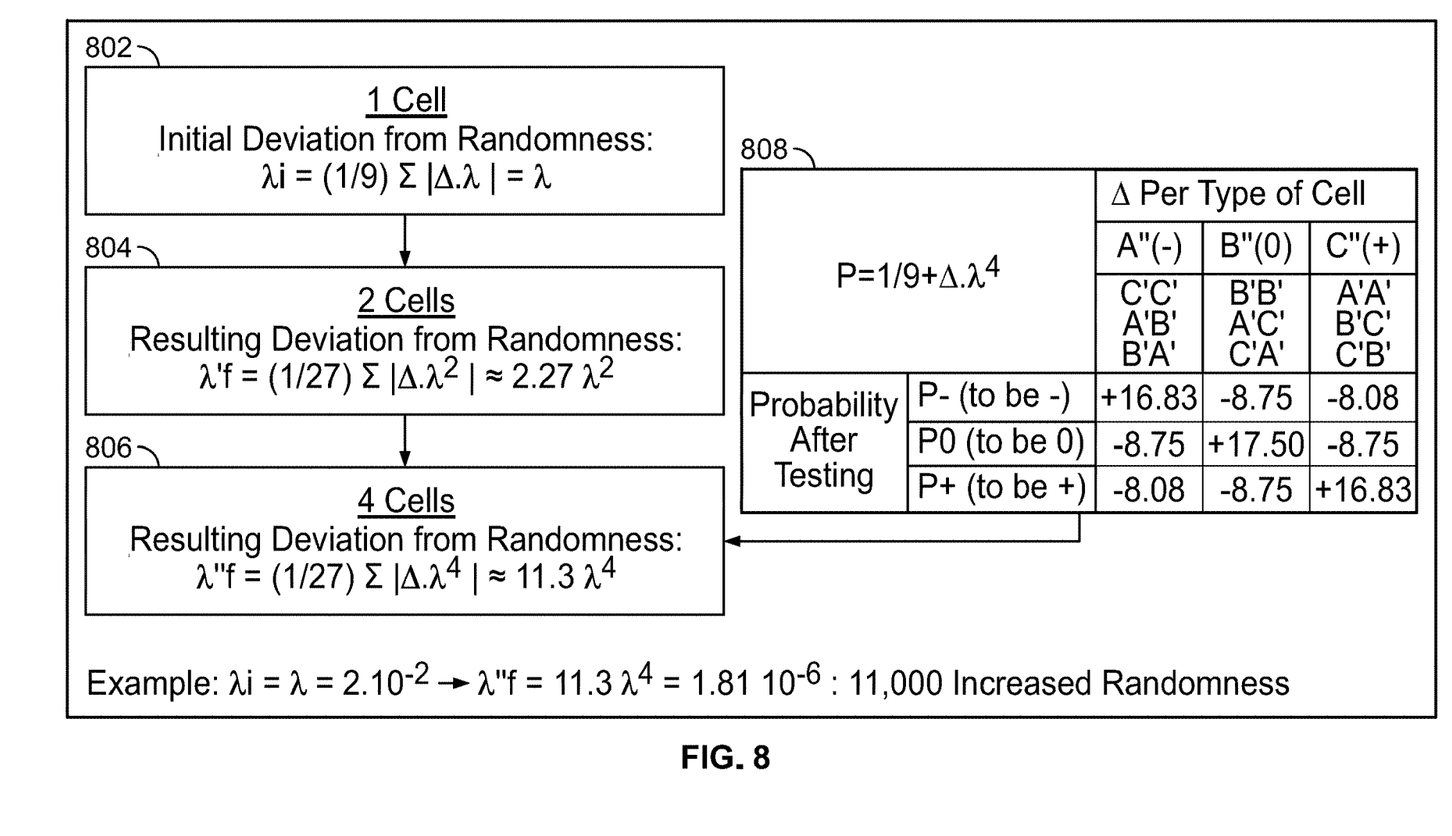
FIG. 8 depict attributes of a random number generator using a modulo 3 adder that combines outputs from four cells of a PUF.

The method presented above can be extended to the addition mod 3 of four sequential trits to generate trits of higher randomness in other embodiments. This process is depicted in FIG. 8, where block 802 depicts the deviation from randomness for a single input value, block 804 depicts the deviation from randomness for two input values combined by a modulo function, and block 806 depicts the deviation from randomness for 4 input values combined by a modulo function. Table 808 provides further details relating to the derivation of the deviation from randomness for the 4 input value implementation.

The resulting deviation from randomness of the new stream of four trits is given by:

$$\lambda''f=(1/27)\Sigma|\Delta\cdot\lambda^4|\approx 11.3\lambda^4; \text{ also: } \lambda''f=2.27(\lambda'f)^2=2.27(2.27)^2\lambda^4\approx 11.3\lambda^4$$

For example, if the initial deviation is $\lambda=2\times10^{-2}$; the resulting deviation is:

$$\lambda''f=11.3\times2^4\times10^{-8}=1.81\times10^{-6}$$

By extension, after addition of 8 sequential trits, the deviation from randomness $\lambda''''$ will be: $\lambda''''f=2.27 (\lambda''f)^2 \approx 290\lambda^8$ For example, if the initial deviation is $\lambda=2\ 10^{-2}$; the resulting deviation is: $\lambda''''f=290\times2^8\times10^{-16}=7.4\times10^{-12}$, which is more than $10^{-9}$ times more randomness.

In an embodiment, the parameter $\mathcal{P}$ that is analyzed is the $V_{set}$ of the array of metal-oxide resistive RAM. The transition between the "−" state and the "+" state of the distribution may be about 2.1 Volts, and this distribution is considered a normal distribution.

In one embodiment, only 2% of the cells are X-cells. For these cells, parameter $\mathcal{P}$ is very close to the transition of 2.1 Volt. $\lambda_i 2\times10^{-2}$.

In another embodiment, 4% of the cells are X-cells. $\lambda_i=4\times10^{-2}$.

In another embodiment, 7% of the cells are X-cells. $\lambda_i=6\times10^{-2}$.

In another embodiment, 11% of the cells are X-cells. $\lambda_i=1\times10^{-1}$.

Figure 9:
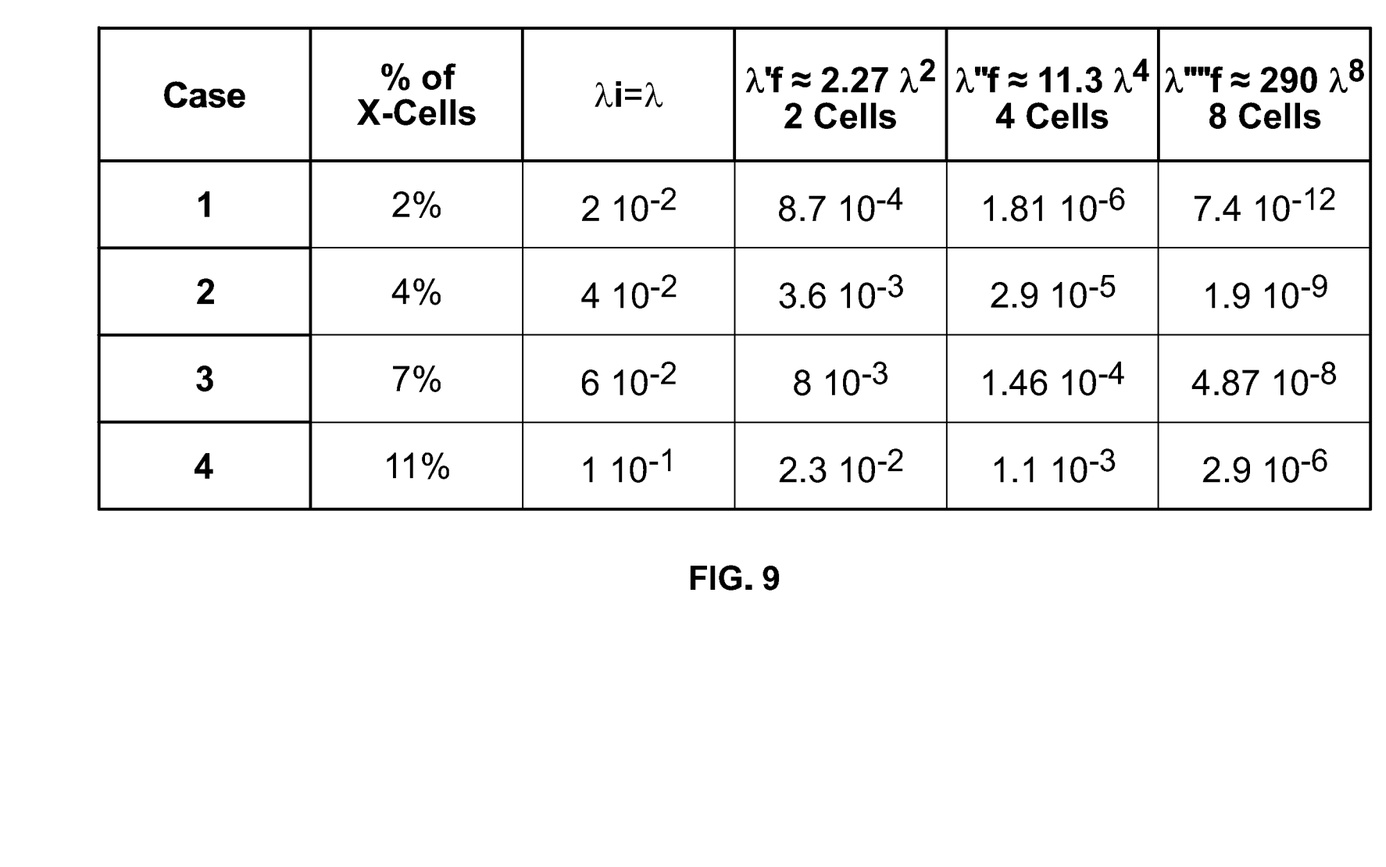
FIG. 9 is a table depicting randomness levels for various experimental cases.
Figure 10:
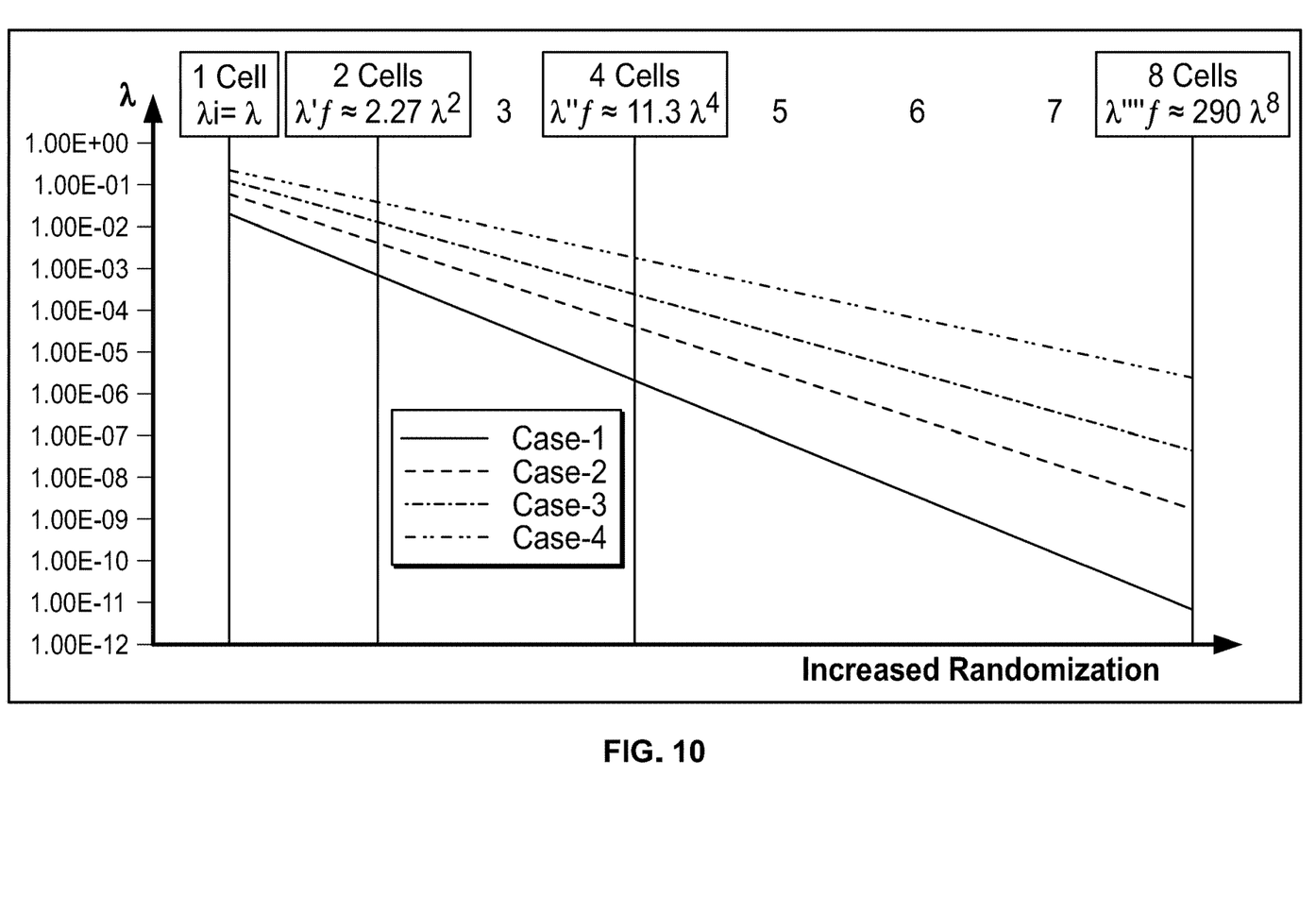
FIG. 10 is a graph depicting changes in randomness levels for multiple test case implementations utilizing modulo 3 adders to combine input grouping of random numbers.

A probabilistic model is used to analyze the four experimental cases. FIG. 9 and FIG. 10 illustrate the impact of the addition mod 3 on the randomness of the resulting data streams of trits when the number of cells involved vary from 2 to 8.

In all cases the addition mod 3 when applied to a data stream of trits generated by a PUF is very efficient to enhance randomness. In one embodiment, the one with the highest level of initial randomness benefits the most from Modulo 3 sum adders. It is straight forward to use the model as a predictive tool. For example, as shown in FIG. 10, the number cells necessary to get $\lambda_f<5\ 10^{-6}$ for case 1 is 4, it is 5 for case 2, it is 6 for case 3, and it is 8 for case 4.

Figure 11:
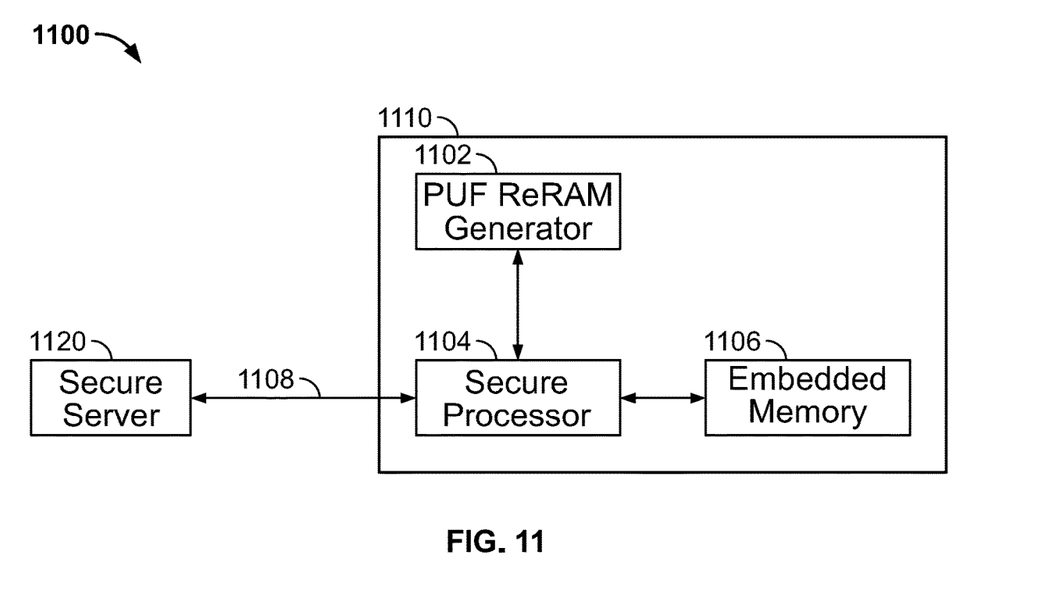
FIG. 11 is a block diagram depicting components of a PUF-based random number generator and authentication system in accordance with the present disclosure.

FIG. 11 illustrates a block diagram of an implementation of a system 1100 that utilizes PUFs, such as those which may be derived from ReRAM cells. As shown, a device 1110 (e.g., a device seeking authentication) may be coupled to a secure server 1120 via a connection 1108, and may include a PUF generator 1102, a secure processor 1104, and an embedded memory 1106. In some embodiments, the connection 1108 may be a direct wired or wireless connection (e.g., a serial cable, an Ethernet cable, a Wi-Fi connection, etc.), while in other embodiments, the connection 1108 may represent an electronic communications network made up of multiple connections and devices (e.g., the Internet).

With the ReRAM-based PUF authentication architecture shown, PUF responses are extracted from the PUF ReRAM memory generator 1102 by applying power to the cells of the PUF ReRAM memory generator 1102. These responses may then be provided to the secure processor 1104 of the device 1110. The secure processor 1104 may perform a comparison of the responses generated by the PUF ReRAM generator 1102 with a stored PUF key (e.g., corresponding to the previously generated challenge [i.e., expected or initial response] of the PUF ReRAM generator 1102), which may be provided to the secure processor 1104 for by the secure server 1120 and stored in the embedded memory 1106. The embedded memory 1106 may, for example, be a non-transitory computer-readable memory, such as a hard-disk drive, a solid-state drive, or flash memory. In alternate embodiments, this comparison may be performed at the secure server 1120. If the responses generated by the PUF ReRAM generator 1102 substantially match the stored PUF key (e.g., above a predefined correlation threshold), the device 1110 will be successfully authenticated.

Additionally, in accordance with the present disclosure PUF ReRAM Generator 1102 may be configured to generate ternary random numbers in accordance with the techniques and methods described herein. For example, a processor of device 1110 may be configured to cause PUF ReRAM Generator 1102 to read parameter values for a plurality of unstable cells within the memory array of PUF ReRAM Generator 1102 to generate a data stream of random ternary values. Then, as described above, the processor may be configured to combine portions of the data stream (or multiple, separate data streams) via, for example, a modulo operation, to generate an output data stream that contains random trit values.

The TRNG design can be generalized to other embodiments. As described previously herein, the random trits are generated from memory based physically unclonable functions. The method can be extended to any PUF. It could be conceived that Flash NAND, NOR, or EEPROM memories may be used. In other embodiments it is conceived that DRAM, SDRAM, DDR-RAM memories may be used. Additionally, other PUF hardware devices that have been contemplated are ReRAM, CBRAM, memristor, SRAM, and buffer memories. The TRNG system may be generalized to ring oscillators, gate-delay based PUFs, and optical or sensor PUFs.

In all cases the physical component generates a data stream of trits with a deviation from absolute randomness $\lambda_{in}$, where the addition mod 3 can enhance the randomness of the data stream to meet a particular $\lambda_{out}$ objective.

The method can be extended to n-value logic, for example quaternary logic (4 bits), pentagonal logic (5 bits), or hexagonal logic (6 bits). In such cases the X-cells are divided in n-different type of cells, and the addition of chunk of n-bits is done modulo "n".

The system and method presented here presents some distinct advantages over the prior art. The ability to directly generate a stream of random trits without having to convert binary data streams into ternary data streams. The combination of the use X-cells from a memory array, and the Modulo 3 sum adders enhance the randomness of the ternary TRNG. It is possible to model with the probabilistic model the minimum size of chunk of trits f that need to be added to reach a minimum $\lambda_f$.

The new method minimizes sensitivity to parameter drifts such as temperature or biasing conditions. The hardware implementation can use known circuitry in commercial CMOS for the modular 3 adders. The method can reach NIST expectations in term of deviation from pure randomness of the TRNG, even if the randomness created by the PUF is weak.

In embodiments, a method includes generating a plurality of parameter values by inspecting a plurality of cells in a memory array. Each parameter value in the plurality of parameter values is associated with a cell of the plurality of cells. The method includes identifying a plurality of unstable cells in the plurality of cells. Each unstable cell in the plurality of unstable cells is associated with a parameter value within a threshold value of an average of the plurality of parameter values. The method includes associating a first group of cells in the plurality of unstable cells with a first value. Each cell in the first group of cells is associated with a parameter value that is less than the average of the plurality of parameter values. The method includes associating a second group of cells in the plurality of unstable cells with a second value. Each cell in the first group of cells is associated with a parameter value that is greater than the average of the plurality of parameter values. The method includes associating a third group of cells in the plurality of unstable cells with a third value and generating a data stream using the first group of cells, the second group of cells, and the third group of cells.

In another embodiment, a method includes generating a plurality of parameter values by inspecting a plurality of cells in a memory array. Each parameter value in the plurality of parameter values is associated with a cell of the plurality of cells. The method includes identifying a plurality of unstable cells in the plurality of cells, using the parameter values to group the plurality of unstable cells into a first group of unstable cells, a second group of unstable cells, and a third group of unstable cells, and generating a data stream using the first group of unstable cells, the second group of unstable cells, and the third group of unstable cells.

In another embodiment, a system includes a memory array including a plurality of cells and a processor. The processor is configured to perform the steps of generating a plurality of parameter values by inspecting the plurality of cells in the memory array. Each parameter value in the plurality of parameter values is associated with a cell of the plurality of cells. The processor is configured to perform the steps of identifying a plurality of unstable cells in the plurality of cells, using the parameter values to group the plurality of unstable cells into a first group of unstable cells, a second group of unstable cells, and a third group of unstable cells, and generating a data stream using the first group of unstable cells, the second group of unstable cells, and the third group of unstable cells.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

I claim:

1. A method, comprising:
   generating a plurality of parameter values by inspecting a plurality of cells in a memory array, wherein each parameter value in the plurality of parameter values is associated with a cell of the plurality of cells;
   identifying a plurality of unstable cells in the plurality of cells, wherein each unstable cell in the plurality of unstable cells is associated with a parameter value within a threshold value of an average of the plurality of parameter values;
   measuring a plurality of the identified unstable cells to generate a data stream, wherein the data stream includes a plurality of trinary values;
   combining the plurality of trinary values from the data stream into a first group of trinary values; and
   performing a modulo three sum operation on the trinary values in the first group of trinary values to generate a random output value.

2. The method of claim 1, further comprising
   associating a first group of cells in the plurality of unstable cells with a first value, wherein each cell in the first group of cells is associated with a parameter value that is less than the average of the plurality of parameter values;
   associating a second group of cells in the plurality of unstable cells with a second value, wherein each cell in the second group of cells is associated with a parameter value that is greater than the average of the plurality of parameter values;
   associating a third group of cells in the plurality of unstable cells with a third value, wherein measuring a plurality of the identified unstable cells to generate a data stream comprises measuring cells in the first, second and third groups of cells.

3. The method of claim 1, wherein the plurality of trinary values consists of two trinary values.

4. The method of claim 1, wherein the plurality of parameter values include a set voltage for each cell in the plurality of cells in the memory array.

5. The method of claim 1, wherein the memory array is a resistive random access memory, conductive bridge random access memory, memristor, flash memory, electrically erasable programmable read-only memory, dynamic random-access memory, synchronous dynamic random-access memory, double data rate synchronous dynamic random-access memory, static random-access memory, a phase change memory, magnetoresistive random-access memory, a magnetic memory, or a hard disk.

6. The method of claim 1, wherein generating a plurality of parameter values includes measuring a physical attribute of a physical unclonable function.

7. The method of claim 1, wherein each parameter value in the plurality of parameter values is an average parameter value for the associated cell in the memory array.

8. A method, comprising:
   generating a plurality of parameter values by inspecting a plurality of cells in a memory array, wherein each parameter value in the plurality of parameter values is associated with a cell of the plurality of cells;
   identifying a plurality of unstable cells in the plurality of cells;
   generating a data stream including a plurality of trinary values by measuring a plurality of the identified unstable cells;
   combining the plurality of trinary values from the data stream into a first group of trinary values; and
   adding the trinary values in the first group of trinary values to generate a random output value.

9. The method of claim 8, further comprising
   using the parameter values to group the plurality of unstable cells into a first group of unstable cells, a second group of unstable cells, and a third group of unstable cells; and wherein generating a data stream including a plurality of trinary values by measuring a plurality of the identified unstable cells includes measuring cells in the first group of unstable cells, the second group of unstable cells, and the third group of unstable cells.

10. The method of claim 8, wherein the plurality of trinary values consists of two trinary values.

11. The method of claim 8, wherein the plurality of parameter values include a set voltage for each cell in the plurality of cells in the memory array.

12. The method of claim 8, wherein the memory array is a resistive random access memory, conductive bridge random access memory, memristor, flash memory, electrically erasable programmable read-only memory, dynamic random-access memory, synchronous dynamic random-access memory, double data rate synchronous dynamic random-access memory, static random-access memory, a phase change memory, magnetoresistive random-access memory, a magnetic memory, or a hard disk.

13. The method of claim 8, wherein generating a plurality of parameter values includes measuring a physical attribute of a physical unclonable function.

14. The method of claim 8, wherein each parameter value in the plurality of parameter values is an average parameter value for the associated cell in the memory array.

15. A system, comprising:
a memory array including a plurality of cells; and
a processor configured to perform the steps of:
generating a plurality of parameter values by inspecting the plurality of cells in the memory array, wherein each parameter value in the plurality of parameter values is associated with a cell of the plurality of cells,
identifying a plurality of unstable cells in the plurality of cells,
generating a data stream including a plurality of trinary values by measuring a plurality of the identified unstable cells;
combining the plurality of trinary values from the data stream into a first group of trinary values; and
adding the trinary values in the first group of trinary values to generate a random output value.

16. The system of claim 15, further comprising
using the parameter values to group the plurality of unstable cells into a first group of unstable cells, a second group of unstable cells, and a third group of unstable cells, and wherein generating a data stream including a plurality of trinary values by measuring a plurality of the identified unstable cells comprises measuring cells in the first group of unstable cells, the second group of unstable cells, and the third group of unstable cells.

17. The system of claim 15, wherein the plurality of parameter values include a set voltage for each cell in the plurality of cells in the memory array.

18. The system of claim 15, wherein the memory array is a resistive random access memory, conductive bridge random access memory, memristor, flash memory, electrically erasable programmable read-only memory, dynamic random-access memory, synchronous dynamic random-access memory, double data rate synchronous dynamic random-access memory, static random-access memory, a phase change memory, magnetoresistive random-access memory, a magnetic memory, or a hard disk.

19. The system of claim 15, wherein the processor is configured to perform the step of generating the plurality of parameter values by measuring a physical attribute of a physical unclonable function.

20. The system of claim 15, wherein each parameter value in the plurality of parameter values is an average parameter value for the associated cell in the memory array.

* * * * *